United States Patent
Jung et al.

(10) Patent No.: US 10,974,621 B2
(45) Date of Patent: Apr. 13, 2021

(54) WALK-IN APPARATUS FOR VEHICULAR SEAT

(71) Applicants: Hyundai Motor Company, Seoul (KR); Kia Motors Corporation, Seoul (KR); Das Co., Ltd., Gyeongsangbuk-do (KR)

(72) Inventors: Ho Suk Jung, Gyeonggi-do (KR); Sang Ho Kim, Incheon (KR); Sang Soo Lee, Gyeonggi-do (KR); Dong Man Lee, Gyeonggi-do (KR); Jeong Gyu Kong, Gyeonggi-do (KR)

(73) Assignees: Hyundai Motor Company, Seoul (KR); Kia Motors Corporation, Seoul (KR); Das Co., Ltd., Gyeongsangbuk-do (KR)

( * ) Notice: Subject to any disclaimer, the term of this patent is extended or adjusted under 35 U.S.C. 154(b) by 0 days.

(21) Appl. No.: 16/661,589

(22) Filed: Oct. 23, 2019

(65) Prior Publication Data
US 2020/0391621 A1    Dec. 17, 2020

(30) Foreign Application Priority Data
Jun. 14, 2019    (KR) ........................ 10-2019-0070379

(51) Int. Cl.
*A47C 1/00*    (2006.01)
*B60N 2/10*    (2006.01)
*B60N 2/04*    (2006.01)
*B60N 2/02*    (2006.01)

(52) U.S. Cl.
CPC ............... *B60N 2/10* (2013.01); *B60N 2/045* (2013.01); *B60N 2002/0216* (2013.01)

(58) Field of Classification Search
CPC ... B60N 2/12; B60N 2/14; B60N 2/10; B60N 2/20; B60N 2/1695
USPC .......... 297/311, 313, 463.1, 344.1, 317, 324, 297/344.14
See application file for complete search history.

(56) References Cited

U.S. PATENT DOCUMENTS

| | | | | |
|---|---|---|---|---|
| 6,354,553 | B1 * | 3/2002 | Lagerweij | B60N 2/0715 248/429 |
| 6,405,987 | B1 * | 6/2002 | Andrigo | B60N 2/0705 248/429 |
| 10,596,928 | B2 * | 3/2020 | Pleskot | B60N 2/12 |
| 2009/0230752 | A1 * | 9/2009 | Adragna | B60N 2/1615 297/463.1 |
| 2011/0210586 | A1 * | 9/2011 | Masutani | B60N 2/42763 297/216.1 |
| 2014/0361592 | A1 | 12/2014 | Kuno | |
| 2018/0272896 | A1 * | 9/2018 | Park | B60N 2/12 |

(Continued)

FOREIGN PATENT DOCUMENTS

| | | |
|---|---|---|
| JP | 2004-58928 A | 2/2004 |
| JP | 5857667 B2 | 2/2016 |
| KR | 10-1565581 B1 | 11/2015 |

*Primary Examiner* — Chi Q Nguyen
(74) *Attorney, Agent, or Firm* — Mintz Levin Cohn Ferris Glovsky and Popeo, P.C.; Peter F. Corless (57) ABSTRACT

A walk-in apparatus for a vehicular seat provides a space behind the vehicular seat even when a seat back is not folded forwards during a walk-in motion. Since the rear end of a seat cushion is raised when the walk-in motion is performed, a space for accommodating the rear seat passenger's feet is provided under the seat cushion, thereby improving the rear seat passenger's comfort.

11 Claims, 7 Drawing Sheets

(56) References Cited

U.S. PATENT DOCUMENTS

| | | | | |
|---|---|---|---|---|
| 2018/0361882 A1* | 12/2018 | Ikeda | ............... | B60N 2/005 |
| 2019/0152352 A1* | 5/2019 | Handigol | ............ | B60N 2/1695 |
| 2019/0225120 A1* | 7/2019 | Kish | ............... | B60N 2/045 |
| 2020/0055428 A1* | 2/2020 | Kakishima | ........... | B60N 2/3011 |
| 2020/0101870 A1* | 4/2020 | Aktas | ............... | B60N 2/0806 |
| 2020/0156516 A1* | 5/2020 | Kakishima | ........... | B60N 3/102 |
| 2020/0215935 A1* | 7/2020 | Maekawa | ........... | B60N 2/0232 |

\* cited by examiner

WALK-IN APPARATUS FOR VEHICULAR SEAT

CROSS-REFERENCE TO RELATED APPLICATION

This application claims under 35 U.S.C. § 119(a) the benefit of Korean Patent Application No. 10-2019-0070379, filed on Jun. 14, 2019 in the Korean Intellectual Property Office, the entire contents of which are incorporated herein by reference.

BACKGROUND

1. Technical Field

The present disclosure relates to a walk-in apparatus for a vehicular seat, more particularly, to the walk-in apparatus constructed to provide a space behind the vehicular seat even when a seat back is not folded forwards during a walk-in motion for movement of the vehicular seat.

2. Description of the Related Art

A vehicular seat is designed to enable a driver or passenger to sit thereon in a comfortable position so as to prevent the driver or passenger from feeling fatigued even during long-distance travel. Typically, the vehicular seat is composed of a seat cushion, which is mounted on an interior bottom surface of a vehicle so as to be slidable anteroposteriorly (i.e., in a front-to-back or back-to-front direction) and which supports the load of a passenger, and a seat back, which is coupled to the seat cushion so as to be rotatable to a predetermined angle and to support the passenger's back.

An interior of a vehicle may require various spaces for accommodating persons having various body sizes and goods loaded therein.

In order to meet seating and cargo requirements, a conventional vehicle is designed to enable a seat back to be folded and to be freely rotated to a desired angle. More recently, in order to allow a rear seat passenger to easily enter a vehicle, a 3-door vehicle or a 2-door vehicle such as a coupe is constructed such that the front seat is slidable forwards so as to increase an opening area of the door. Further, in order to maximize the interior space in the vehicle, the front seat is adapted to be folded in addition to the sliding of the front seat. The ability to slide the front seat is referred to as a walk-in function.

In order to implement the walk-in function in a conventional manner, a motion in which a seat back is folded to a cushion is inevitably required. Hence, there are problems in that a passenger has to move a front seat forward after folding the seat and in that the front seat cannot be folded when a child seat is mounted on the front seat or goods are placed on the front seat, thereby making it impossible to perform the walk-in motion.

The details described as the background art are intended merely for the purpose of promoting the understanding of the background of the present disclosure and should not be construed as an acknowledgment of the prior art that is previously known to those of ordinary skill in the art.

SUMMARY

Therefore, the present disclosure provides a walk-in apparatus for a vehicular seat which is constructed to provide a space behind the vehicular seat even when a seat back is not folded forwards during a walk-in motion for movement of the vehicular seat.

In accordance with the present disclosure, the above and other objects can be accomplished by the provision of a walk-in apparatus for a vehicular seat including a cushion frame to which a back frame is rotatably coupled via a recliner, guide rails fixedly disposed under the cushion frame so as to provide a path along which the cushion frame is moved anteroposteriorly, and a tray slidably mounted on the guide rails and to which the cushion frame is coupled so as to be rotated anteroposteriorly, such that when the cushion frame is moved forwards from an initial position, a rear end of the cushion frame is raised while a front end of the cushion frame is lowered.

The walk-in apparatus may further include a locking link, which is rotatably coupled to a rear end of the tray and to which the rear end of the cushion frame is rotatably coupled so as to rotatably support the cushion frame with respect to the tray, the locking link being rotated and erected from a position in which the cushion frame is initially laid flat.

The locking link may be rotatably coupled at one end thereof to the tray and may be rotatably coupled at a remaining end thereof to a rear end of the cushion frame, the remaining end of the locking link being provided with a sector part having a predetermined radius of curvature.

The walk-in apparatus may further include a locking pawl, which is rotatably coupled to the cushion frame so as to be brought into contact with the sector part of the locking link such that the locking pawl restricts the rotation of the locking link so as to restrict the initial position of the cushion frame or permits rotation of the locking link depending on a contact position between the locking pawl and the sector part.

The sector part of the locking link may include a plurality of engagement protrusions formed on a portion of an outer periphery thereof, and the locking pawl may be rotatably coupled at one end thereof to the cushion frame and may include a plurality of engagement protrusions, which are formed on a remaining end thereof so as to engage with the plurality of engagement protrusions of the sector part.

The walk-in apparatus may further include a locking cam, which is rotatably coupled to the cushion frame so as to be brought into contact with the locking pawl and to be moved in a seesaw manner and which is connected to a cable, which is moved in linkage with an actuating lever, whereby, when pulling force of the cable is applied to the locking cam due to manipulation of the actuating lever, the locking cam rotates the locking pawl, thereby allowing the rotation of the locking link.

The locking pawl may have a depressed groove therein, and the locking cam may extend at one end thereof so as to be disposed in the depressed groove and to be caught thereby, and may be connected at a remaining end thereof to the cable, whereby the locking pawl is rotated when the locking cam is rotated due to pulling force of the cable.

The sector part may have a guide slit, which extends along an imaginary arc which is plotted about a rotational axis at which the other end of the locking link is coupled to the cushion frame, and the cushion frame may include a guide protrusion, which is disposed in the guide slit.

The walk-in apparatus may further include an elastic member, which is fixed at one end thereof to the cushion frame and is fixed at a remaining end thereof to the locking link so as to provide the locking link with elastic force.

The tray may have a guide hole, which is formed in a middle portion thereof and which extends in a curved line, and the cushion frame may include a guide pin, which is provided at a middle portion thereof and is disposed in the guide hole.

The guide hole may extend forwards and downwards in a curved line.

The walk-in apparatus may further include a rotational link, which is rotatably coupled to a front end of the tray and to which the front end of the cushion frame is rotatably coupled, so as to rotatably support the cushion frame with respect to the tray, the rotational link being converted from a position in which the cushion frame is initially erected into a position in which the cushion frame is rotated forwards and is laid flat.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a walk-in apparatus for a vehicular seat according to a preferred embodiment of the present disclosure will be described with reference to the accompanying drawings.

Figure 1:
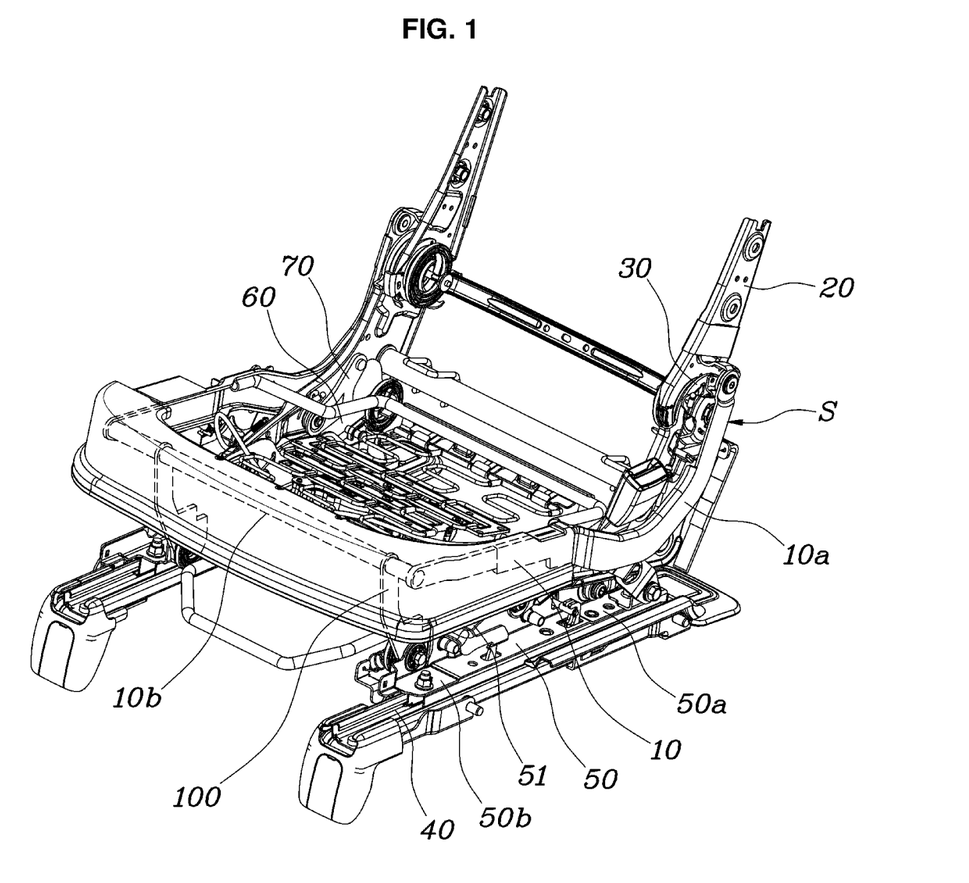
FIG. 1 is a view illustrating a walk-in apparatus for a vehicular seat according to an embodiment of the present disclosure.

FIG. 1 is a view illustrating a walk-in apparatus for a vehicular seat according to an embodiment of the present disclosure. FIGS. 2 to 7 are views illustrating the operation of the walk-in apparatus for a vehicular seat shown in FIG. 1.

Figure 2:
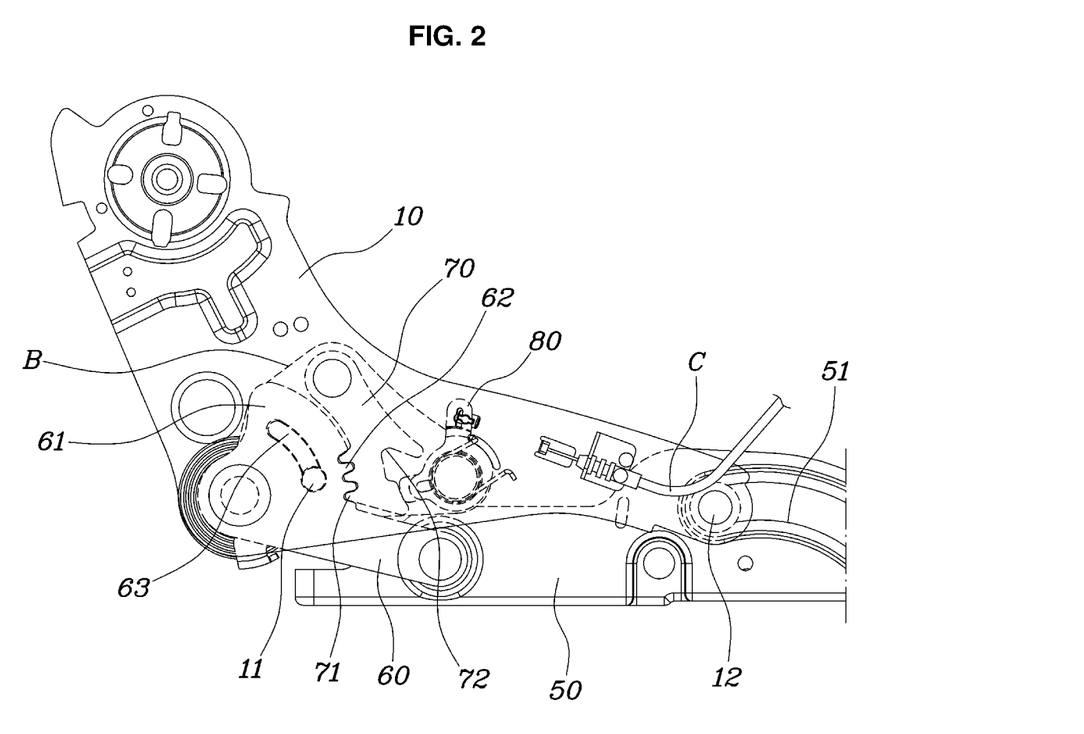
FIGS. 2 to 7 are views illustrating the operation of the walk-in apparatus for a vehicular seat shown in FIG. 1.

As illustrated in FIGS. 1 and 2, the walk-in apparatus for a vehicular seat according to the present disclosure includes a cushion frame 10 to which a back frame 20 is rotatably coupled via a recliner 30, guide rails 40 fixedly disposed under the cushion frame 10 so as to allow the cushion frame 10 to be moved anteroposteriorly therealong, and a tray 50 slidably mounted on the guide rails 40 and to which the cushion frame 10 is coupled so as to be rotated anteroposteriorly, such that when the cushion frame 10 is moved forwards from the initial position, the rear end of the cushion frame 10 is raised while the front end of the cushion frame 10 is lowered.

According to the present disclosure, the back frame 20 is coupled to the cushion frame 10 via the recliner 30 so as to define a seat S. The cushion frame 10 is coupled to the tray 50, and the tray 50 is moved along the guide rails 40, thereby moving the seat S anteroposteriorly. Particularly, since the cushion frame 10 is coupled to the tray so as to be rotated anteroposteriorly, the cushion frame 10 may be raised or lowered. When the cushion frame 10 is moved forwards in the walk-in motion, the cushion frame 10 is rotated such that the rear end 10a of the cushion frame 10 is raised while the front end 10b of the cushion frame 10 is lowered. As a result, a space is provided behind the seat S, and a foot space is provided under the cushion frame 10 so as to accommodate therein the rear seat passenger's feet.

Accordingly, when the walk-in motion is performed, the tray 50 is moved forwards along the guide rails 40, and the cushion frame 10 is rotated with respect to the tray 50 such that the rear end 10a of the cushion frame 10 is raised and the front end 10b of the cushion frame 10 is lowered. Accordingly, even when the back frame 20 is not folded, it is possible to provide a space behind the seat S. In addition, when the walk-in motion of the seat S is performed, not only is a space for the rear seat passenger provided, a space for accommodating the rear seat passenger's feet is also provided under the cushion frame 10, thereby increasing the comfort of the rear seat passenger.

The above-described present disclosure will now be described in detail. As illustrated in FIGS. 1 and 2, the walk-in apparatus according to the present disclosure further includes a locking link 60, which is rotatably coupled to the rear end 50a of the tray 50 and to which the rear end 10a of the cushion frame 10 is rotatably coupled so as to rotatably support the cushion frame 10 with respect to the tray 50. The above-mentioned components are rotatably coupled to each other by hinge structures.

The locking link 60 may be configured to have a linear bar shape, which is rotatably coupled at one end thereof to the tray 50 and is rotatably coupled at the other end thereof to the rear end 10a of the cushion frame 10. The locking link 60 is provided at the other end thereof with a sector part 61 having a predetermined radius of curvature.

Since the locking link 60 is coupled both to the rear end 50a of the tray 50 and to the rear end 10a of the cushion frame 10, the cushion frame 10 is supported by the tray 10 via the locking link 60. The locking link 60 is disposed horizontally when the cushion frame 10 is in the initial position, and is erected vertically when the cushion frame 10 is rotated forwards. Accordingly, when the walk-in motion of the seat S is performed, the rear end 10a of the cushion frame 10 is raised.

As illustrated in FIG. 1, the walk-in apparatus according to the present disclosure further includes a rotational link 100, which is rotatably coupled to the front end 50b of the tray 50 and to which the front end 10b of the cushion frame 10 is rotatably coupled, so as to rotatably support the cushion frame 10 with respect to the tray 50. The rotational link 100 may be configured to have a bar shape, and may be bent in order to realize a predetermined rigidity and radius of rotation.

Since the rotational link 100 is coupled both to the front end 50a of the tray 50 and to the front end of the cushion frame 10, the cushion frame 10 is supported by the tray 50 via the rotational link 100. The rotational link 100 is erected vertically when the cushion frame 10 is in the initial position, and is laid flat horizontally when the cushion frame 10 is rotated forwards. Accordingly, when the walk-in motion of the seat S is performed, the front end of the cushion frame 10 is lowered.

Figure 3:
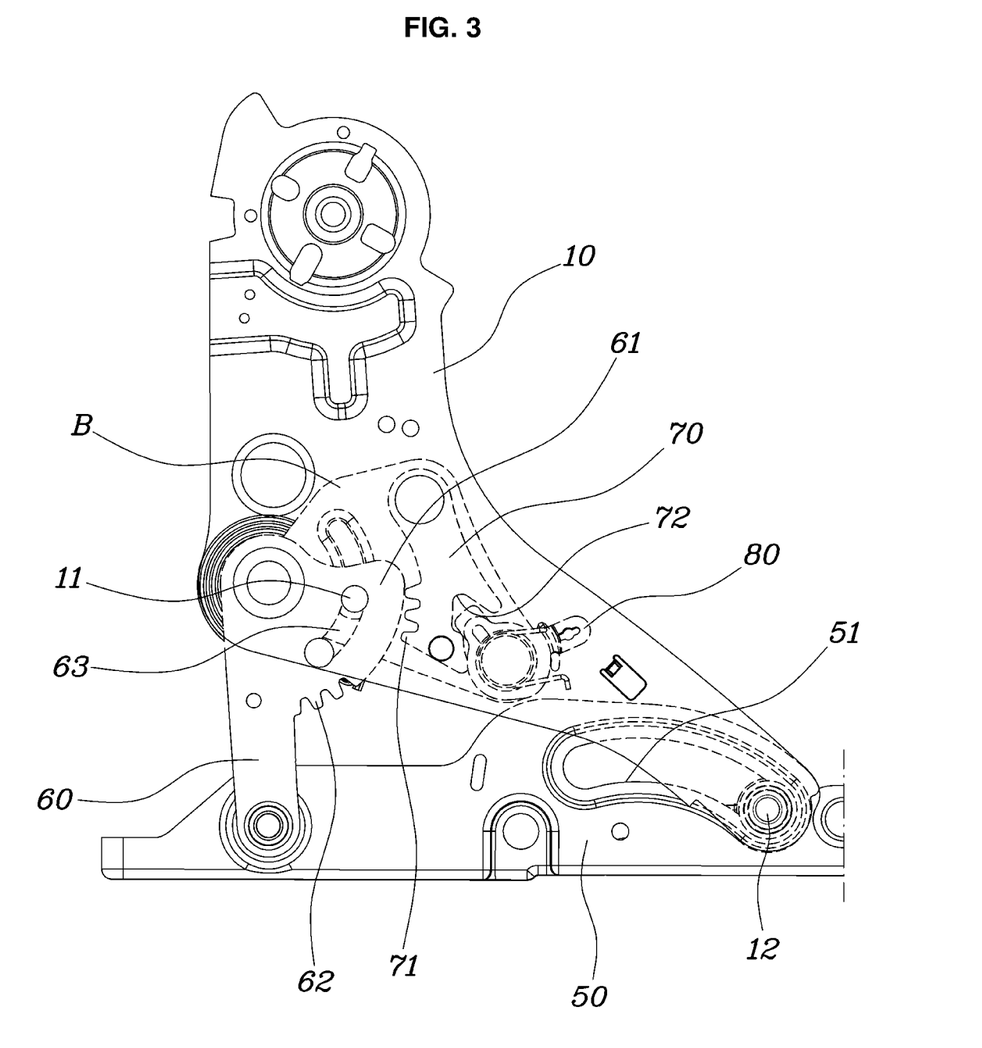
Figure 4:
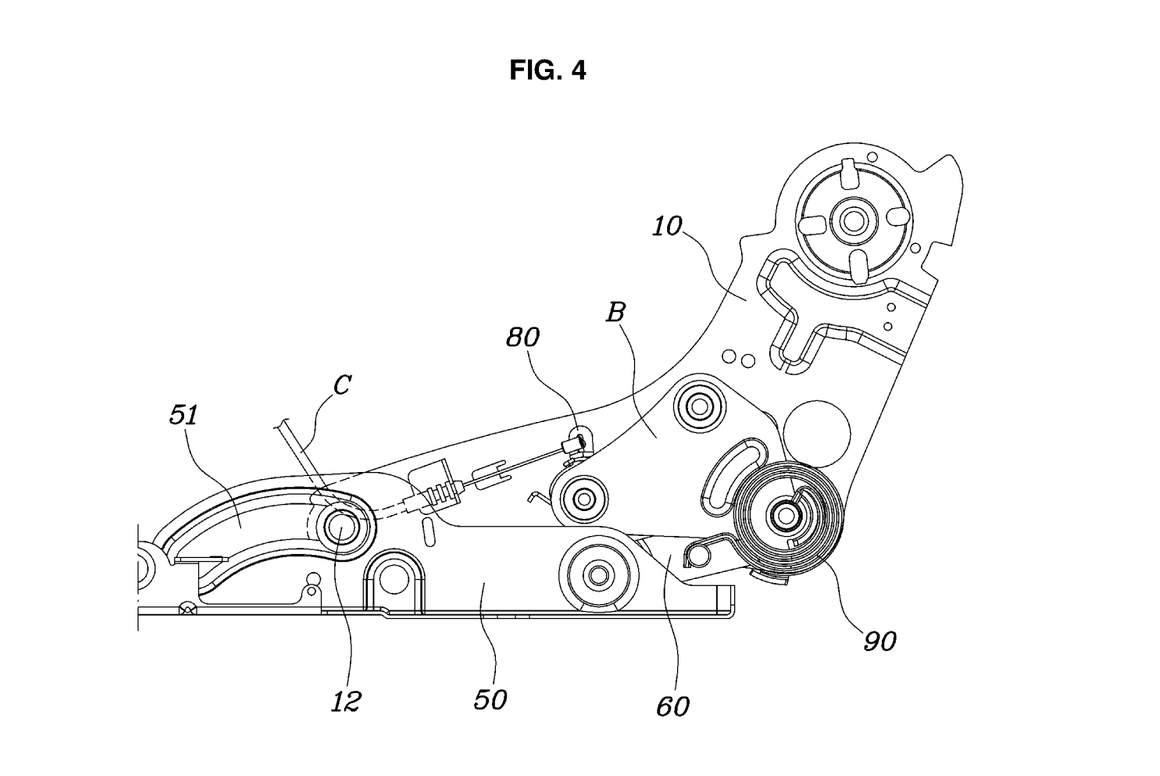

A structure for locking the walk-in position according to the present disclosure will now be described. As illustrated in FIGS. 2 to 4, the walk-in apparatus according to the present disclosure may further include a locking pawl 70, which is rotatably coupled to the cushion frame 10 so as to be brought into contact with the sector part 61 of the locking link 60 such that the locking pawl 70 restricts the rotation of the locking link 60 so as to restrict the initial position of the cushion frame 10 or permits the rotation of the locking link 60 depending on the contact position between the locking pawl 70 and the sector part 61.

In other words, the locking pawl 70 is rotatably coupled to the cushion frame 10 and is maintained in the state of contacting the sector part 61 of the locking link 60. To this end, the locking pawl 70 may be maintained in the state of contacting the sector part 61 by an additional spring connected to the cushion frame 10.

Particularly, the locking pawl 70 functions to restrict or allow the rotation of the locking link 60 depending on the position at which the locking pawl 70 contacts the sector part 61 of the locking link 60. Consequently, the locking pawl 70 restricts the rotation of the locking link 60 to maintain the cushion frame 10 in the initial position when the cushion frame 10 is disposed in the initial position, and the locking link 60 is rotated so as to allow the rotational movement of the cushion frame 10 when the locking pawl 70 allows the rotation of the locking link 60.

To this end, the sector part 61 of the locking link 60 may be provided on a portion of the outer periphery thereof with a plurality of engagement protrusions 62, and the locking pawl 70 may be rotatably coupled at one end thereof to the cushion frame 10 and may be provided at the other end thereof with a plurality of engagement protrusions 71, which engage with the engagement protrusions 62.

In other words, since the sector part 61 is provided at the outer periphery thereof with the plurality of engagement protrusions 62 and the locking pawl 70 is provided at a corresponding end thereof with the plurality of grooves 71, which engage with the engagement protrusions 62, the rotation of the locking link 60 may be restricted when the engagement protrusions 62 engage with the engagement protrusions 71. Here, the locking link 60 is always maintained in the state of contacting the locking pawl 70, and the engagement protrusions 62 are provided only at a portion of the outer periphery of the sector part 61. Consequently, the rotation of the locking link 60 is restricted only when the engagement protrusions 62 engage with the engagement protrusions 71 of the locking pawl 70, and is allowed when the engagement protrusions 71 of the locking pawl 70 are brought into contact with the remaining portion of the outer periphery of the sector part 61, other than the engagement protrusions 62.

The walk-in apparatus according to the present disclosure may further include a locking cam 80, which is rotatably coupled to the cushion frame 10 so as to be brought into contact with the locking pawl 70 and to be moved in a seesaw manner and which is connected to a cable C, which is moved in linkage with an actuating lever. Consequently, when the pulling force of the cable C is applied to the locking cam 80 due to manipulation of the actuating lever, the locking cam 80 rotates the locking pawl 70, thereby allowing the rotation of the locking link 60.

The actuating lever may be mounted on the back frame 20 or the cushion frame 10. When pulling force is applied to the cable C by virtue of actuation of the actuating lever, the locking cam 80, which is connected to the cable C, may be rotated due to the pulling force.

In other words, the locking cam 80 is rotatably coupled to the cushion frame 10, and is maintained in the state of contacting the locking pawl 70. To this end, the locking cam 80 may be maintained in the state of contacting the locking pawl 70 by an additional spring connected to the cushion frame 10.

Specifically, the locking pawl 70 is provided with a depressed groove 72. The locking cam 80 extends at one end thereof so as to be inserted into and caught in the depressed groove 72, and is connected at the other end thereof to the cable C. Consequently, the locking pawl 70 may be rotated due to the pulling force of the cable C.

In other words, the locking cam 80 is configured to be bent such that one end thereof extends so as to be inserted into the depressed groove 72 in the locking pawl 70 and the other end thereof is connected to the cable C. Accordingly, when the pulling force of the cable C is applied to the locking cam 80, the locking cam 80 is moved in a seesaw manner, thereby selectively rotating the locking pawl 70. Consequently, when the actuating lever is not actuated, the state in which one end of the locking cam 80 is disposed in the depressed groove 72 in the locking pawl 70 is maintained. When the actuating lever is actuated, the locking cam 80 is moved in a seesaw manner due to the pulling force transmitted through the cable C, thereby rotating the locking pawl 70. At this point, since the locking pawl 70 allows the rotation of the locking link 60, the cushion frame 10 may be rotated.

As illustrated in FIG. 2, the sector part 61 may be provided with a guide slit 63, which extends along an imaginary arc which is plotted about the rotational axis at which the other end of the locking link 60 is coupled to the cushion frame 10, and the cushion frame 10 may be provided with a guide protrusion 11, which is disposed in the guide slit 63. Accordingly, when the locking link 60 is rotated, the rotation of the locking link 60 is guided along the extending path of the guide slit 63 formed in the sector part 61, thereby enabling stable rotational movement of the locking link 60. As illustrated in FIG. 4, since elastic force is applied to the locking link 60 by an elastic member 90, auxiliary force, which assists in the rotational movement of the cushion frame 10, may be provided to the cushion frame 10. Specifically, the elastic member 90 may be embodied as a spiral spring, which is fixed at one end thereof to the cushion frame 10 and is fixed at the other end to the locking link 60 so as to provide the locking link 60 with elastic force. Accordingly, as the walk-in motion of the seat S is performed, the locking link 60 may be rotated and the elastic member 90 may be restored to the initial position thereof. Before the walk-in motion of the seat S is performed, the auxiliary force may be provided to the locking link 60 so as to rotate the locking link 60 forwards by virtue of the elastic restoring force of the elastic member 90.

As illustrated in FIG. 2, the tray 50 may be provided in a middle portion thereof with a guide hole 51, which extends in a curved line so as to have a predetermined curvature, and the cushion frame 10 may be provided at a middle portion thereof with a guide pin 12, which is disposed in the guide hole 51. The guide hole 51 may extends forwards and downwards a curved path.

Since the guide pin 12 formed on the cushion frame 10 is disposed in the guide hole 51 formed in the tray 50, the front end 10b and the middle portion of the cushion frame 10 may be moved forwards and downwards when the cushion frame 10 is rotated due to the rotation of the locking link 60. In addition, since the guide pin 12 of the cushion frame 10 is disposed in the guide hole 51 in the tray 50 and is supported thereby, the cushion frame 10 may be stably moved.

Further, since the movement of the cushion frame 10 is guided in the direction in which the guide hole 51 extends, walk-in motion in which the front end 10b of the cushion frame 10 is lowered while the rear end 10a of the cushion frame 10 is raised may be implemented.

The locking link 60, the locking pawl 70, and the locking cam 80, which are mentioned above, may be securely coupled to the cushion frame 10 by a bracket B.

Hereinafter, the operation of the walk-in apparatus for the vehicular seat S according to the present disclosure will be described.

Figure 6:
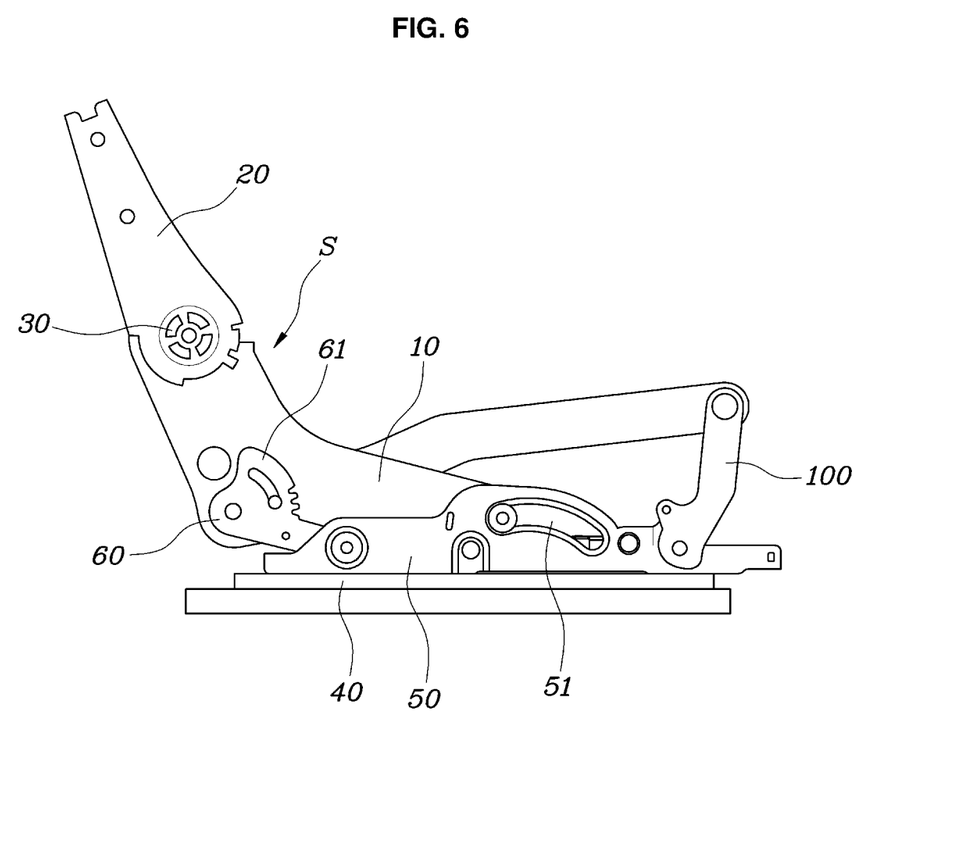

As illustrated in FIGS. 2, 4, and 6, when the seat S is disposed in the initial position, the cushion frame 10 is maintained in the state of being lowered to the tray 50, and the rotation of the locking link 60 is restricted due to engagement between the locking link 60 and the locking pawl 70.

Figure 5:
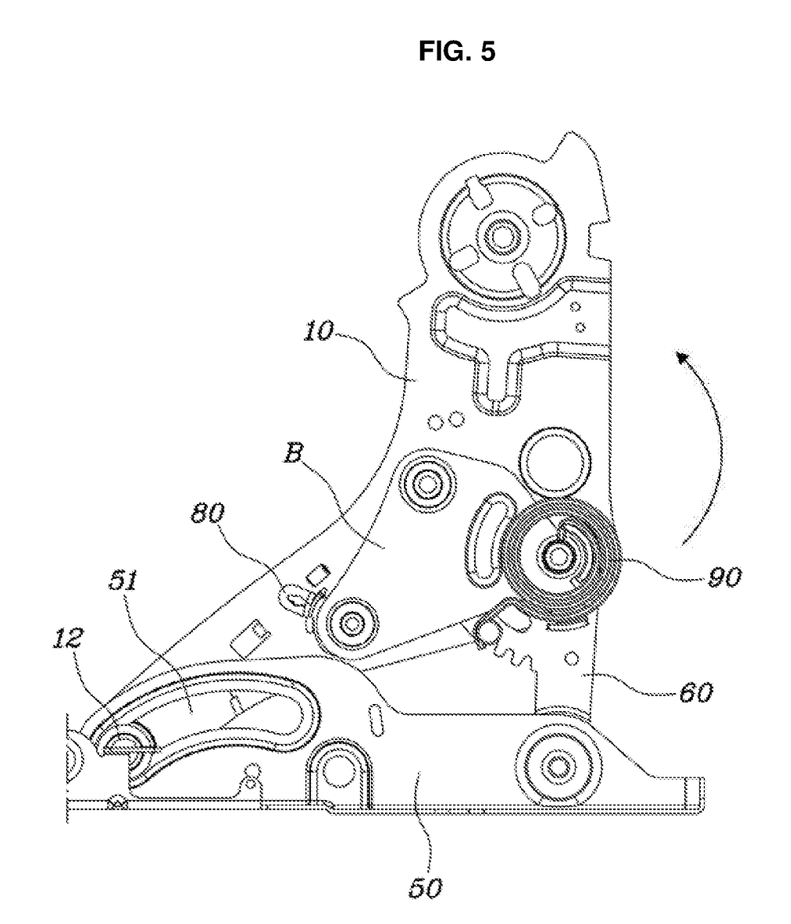
Figure 7:
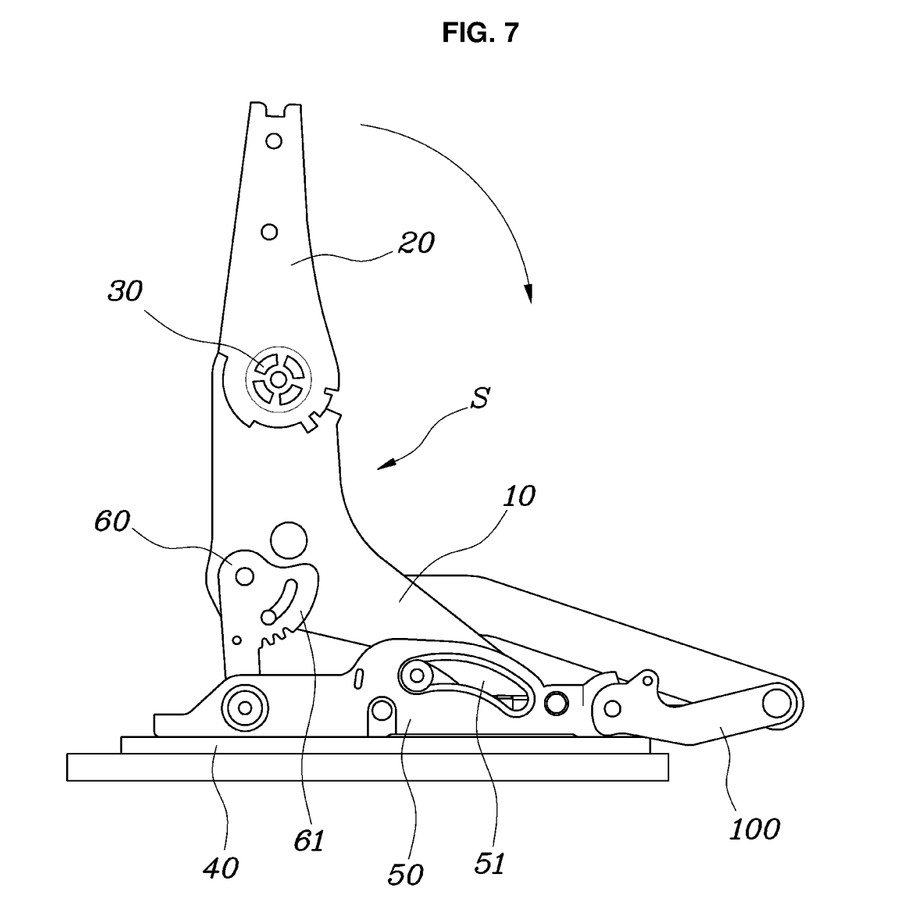

As illustrated in FIGS. 3, 5, and 7, when the locking cam is rotated in a seesaw manner due to the pulling force of the cable C, the locking pawl 70, which engages with the locking cam 80, is raised and rotated, and thus the restriction of the locking link 60 by the locking pawl 70 is released. Consequently, the locking link 60 is rotated by virtue of the elastic force of the elastic member 90, and the cushion frame 10 is raised and moved forwards due to the rotation of the locking link 60.

In other words, the locking link 60 is converted from the position in which the cushion frame 10 is laid flat into the position in which the cushion frame 10 is rotated and erected, and the rotational link 100 is converted from the position in which the cushion frame 10 is erected into the position in which the cushion frame 10 is rotated forwards and laid flat, with the result that the rear end 10a of the cushion frame 10 is raised and the front end 10b of the cushion frame 10 is lowered. At this point, since the guide pin 12 formed on the cushion frame 10 is moved along the guide hole 51 formed in the tray 50, the middle portion and the front end 10b of the cushion frame 10 are moved forwards and downwards when the cushion frame 10 is rotated.

As a result, when the walk-in motion of the seat S is performed, it is possible to provide a space behind the back frame 20 even when the back frame 20 is not folded.

As is apparent from the above description, the walk-in apparatus for a vehicular seat according to the present disclosure provides a space behind the seat even when the seat back is not folded forwards during the walk-in motion for movement of the seat. In addition, since the rear end of the seat cushion is raised when the walk-in motion is performed, a space for accommodating the rear seat passenger's feet is provided under the seat cushion, thereby improving the rear seat passenger's convenience.

Although the preferred embodiment of the present disclosure has been disclosed for illustrative purposes, those skilled in the art will appreciate that various modifications, additions and substitutions are possible, without departing from the scope and spirit of the disclosure as disclosed in the accompanying claims.

What is claimed is:

1. A walk-in apparatus for a vehicular seat, the walk-in apparatus comprising:
   a cushion frame to which a back frame is rotatably coupled via a recliner;
   guide rails fixedly disposed under the cushion frame so as to provide a path along which the cushion frame is moved forward or backward; and
   a tray slidably mounted on the guide rails and to which the cushion frame is coupled so as to be rotated forward or backward, such that when the cushion frame is moved forward from an initial position, a rear end of the cushion frame is raised while a front end of the cushion frame is lowered,
   wherein the tray has a guide hole formed in a middle portion of the tray, the guide hole extending in a curved line, and
   wherein the cushion frame includes a guide pin provided at a middle portion of the cushion frame, the guide pin being disposed in the guide hole.

2. The walk-in apparatus according to claim 1, further comprising a locking link rotatably coupled to a rear end of the tray, wherein the rear end of the cushion frame is rotatably coupled to the locking link so as to rotatably support the cushion frame with respect to the tray, the locking link being rotated and erected from a position in which the cushion frame is initially laid flat.

3. The walk-in apparatus according to claim 2, wherein the locking link is rotatably coupled at one end of the locking link to the tray and is rotatably coupled at a remaining end of the locking link to the rear end of the cushion frame, the remaining end of the locking link being provided with a sector part having a predetermined radius of curvature.

4. The walk-in apparatus according to claim 3, further comprising a locking pawl rotatably coupled to the cushion frame so as to be brought into contact with the sector part of the locking link such that the locking pawl restricts rotation of the locking link so as to restrict the initial position of the cushion frame or permits rotation of the locking link depending on a contact position between the locking pawl and the sector part.

5. The walk-in apparatus according to claim 4, wherein the sector part of the locking link includes a plurality of engagement protrusions formed on a portion of an outer periphery of the sector part, and the locking pawl is rotatably coupled at one end of the locking pawl to the cushion frame and includes a plurality of engagement protrusions formed on a remaining end of the locking pawl so as to engage with the plurality of engagement protrusions of the sector part.

6. The walk-in apparatus according to claim 4, further comprising a locking cam rotatably coupled to the cushion frame so as to be brought into contact with the locking pawl and to be moved in a seesaw manner and connected to a cable, the cable being moved in linkage with an actuating lever, whereby, when pulling force of the cable is applied to the locking cam due to manipulation of the actuating lever, the locking cam rotates the locking pawl, thereby allowing a rotation of the locking link.

7. The walk-in apparatus according to claim 6, wherein the locking pawl has a depressed groove, and the locking cam extends at one end of the locking cam so as to be disposed in the depressed groove and to be caught by the depressed groove, and the locking cam is connected at a remaining end of the locking cam to the cable, whereby the locking pawl is rotated when the locking cam is rotated due to pulling force of the cable.

8. The walk-in apparatus according to claim 3, wherein the sector part has a guide slit extending along an imaginary arc plotted about a rotational axis at which the remaining end of the locking link is coupled to the cushion frame, and the cushion frame includes a guide protrusion disposed in the guide slit.

9. The walk-in apparatus according to claim 2, further comprising an elastic member fixed at one end of the elastic member to the cushion frame and is fixed at a remaining end of the elastic member to the locking link so as to provide the locking link with elastic force.

10. The walk-in apparatus according to claim 1, wherein the guide hole extends forward and downward in a curved line.

11. The walk-in apparatus according to claim 1, further comprising a rotational link rotatably coupled to a front end of the tray and to which the front end of the cushion frame is rotatably coupled, so as to rotatably support the cushion frame with respect to the tray, the rotational link being converted from a position in which the cushion frame is initially erected into a position in which the cushion frame is rotated forward and is laid flat.

\* \* \* \* \*